Nov. 5, 1957 D. L. THOMAS 2,812,388

TWO WAY REPEATERS

Filed Aug. 30, 1954 2 Sheets-Sheet 1

Inventor
D. L. THOMAS
By Philip M. Bolton
Attorney

Nov. 5, 1957 D. L. THOMAS 2,812,388

TWO WAY REPEATERS

Filed Aug. 30, 1954 2 Sheets-Sheet 2

Inventor
D. L. THOMAS
By Philip M. Bolton
Attorney

United States Patent Office 2,812,388

Patented Nov. 5, 1957

2,812,388

TWO WAY REPEATERS

David Lane Thomas, London, England, assignor to International Standard Electric Corporation, New York, N. Y., a corporation of Delaware Application August 30, 1954, Serial No. 453,095

Claims priority, application Great Britain September 11, 1953

3 Claims. (Cl. 179—170)

The present invention relates to electric signal amplifiers, and is particularly concerned with two way repeaters for use at audio frequencies on two wire transmission lines.

The principal object of the invention is to provide a two way repeater circuit which is suitable for use with transistors or crystal triodes instead of with conventional thermionic valves.

According to the present invention there is provided:

(1) A two way repeater arrangement comprising a west line and an east line, amplifiers for transmitting in the respective directions, first and second hybrid transformer coupling the input of the one amplifier to the west line and to a balancing network, and the output of the other amplifier to the west line and to the said network respectively, third and fourth hybrid transformers coupling the output of the said one amplifier to the east line and to a second balancing network and coupling the input of said other amplifier to the east line and said second balancing network respectively and negative feed back paths for the respective amplifiers each connected through a transformer from the output of its respective amplifier to a tapping on a winding of the appropriate hybrid transformer.

Figure 1:
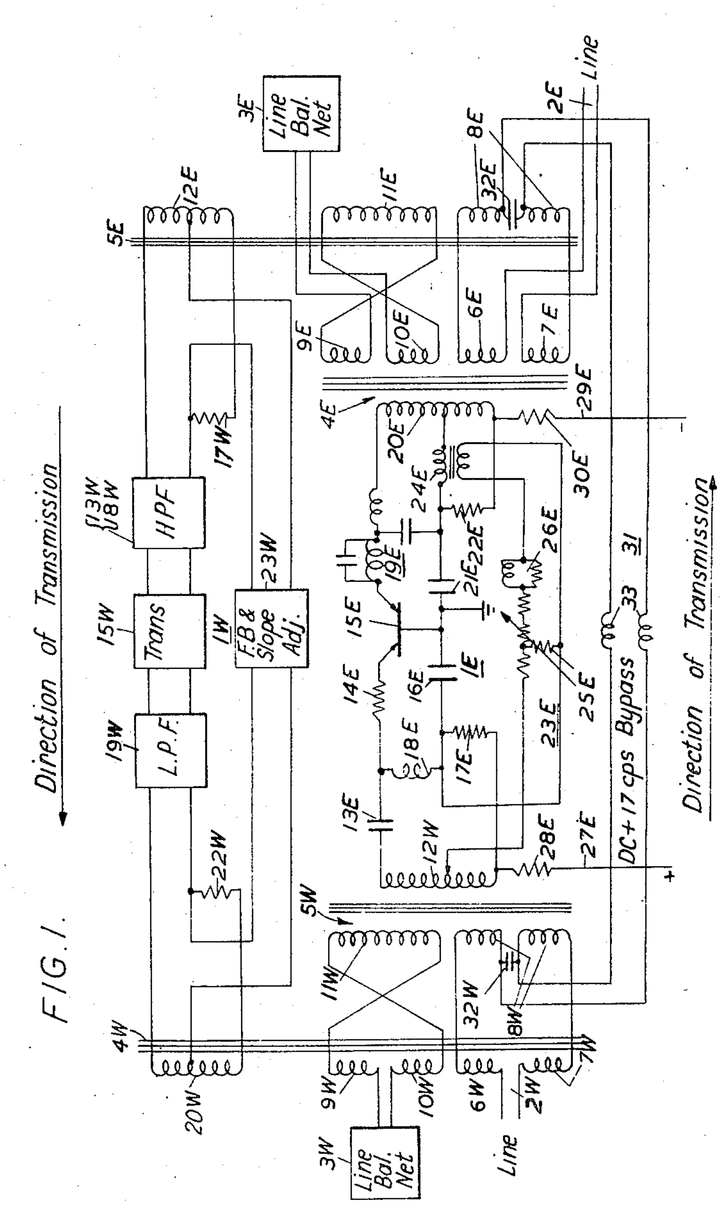
Figure 2:
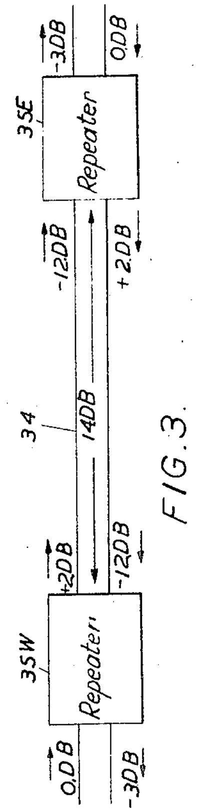
Figure 3:
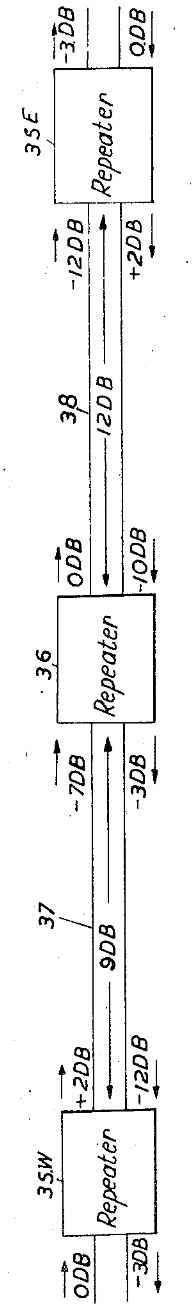

The invention will be described with reference to the accompanying drawings in which:

Fig. 1 shows an example of a two way repeater circuit employing transistors; and Figs. 2 and 3 show block schematic circuit diagrams to illustrate two applications of such repeaters to transmission lines.

Referring to Fig. 1, the repeater circuit comprises two similar amplifiers 1E, 1W used for transmission in the easterly and westerly directions, respectively. Only amplifier No. 1E is shown in detail. The amplifiers are connected to the west and east lines 2W, 2E and to the corresponding balancing networks 3W, 3E by two pairs of hybrid transformers, the western pair being designated 4W and 5W, and the eastern pair 4E and 5E. The balanced line windings 6W, 7W of the line transformer 4W are connected to the terminals of a split primary winding 8W of the input transformer 5W, and the balanced network windings 9W, 10W are connected to a second primary winding 11W of transformer 5W, the connections being crossed as indicated.

This arrangement provides in effect six hybrid transformers effectively built into only four hybrid transformers.

The secondary winding 12W of the transformer 5W has a tapping point dividing it into two portions which are not necessarily equal. The upper terminal of winding 12W is connected through a capacitor 13E and a resistor 14E to the emitter electrode of a transistor 15E, the grounded base electrode of which is connected through a blocking capacitor 16E and a balance resistor 17E to the lower end of winding 12W. The capacitors 13E and 16E are connected by an inductor 18E which forms with the capacitor 13E a half-section of a high pass filter.

The collector electrode of the transistor 15E is connected through a low pass filter 19E to the upper end of the tapped secondary winding 20E of the eastern line transformer 4E. The lower end of the shunt capacitor of the filter 19E is connected to the base electrode of the transistor 15E through a blocking capacitor 21E, and to the lower end of winding 20E through a balance resistor 22E.

An adjustable negative feedback path 23E has its input connected through a transformer 24E to one terminal of the capacitor 21E, and to the tapping point of the winding 20E, which is not necessarily the centre point. The path 23E includes a variable attenuator 25E and a frequency-dependent network 26E for modifying the slope of the gain-frequency characteristic of the amplifier 1E. The output of the path 23E is connected between the lower terminal of the inductor 18E and the tapping point on the winding 12W.

The tapping point on winding 12W is so chosen that a balanced bridge is formed with the impedances of the transistor and its associated networks, and resistors 17E and 22E.

This tapping point is adjustable to provide variable equalizations of the feedback path resistances 4 and 7 being used to stabilize the input impedance of the transistor as seen from the winding 12W, whilst resistance 22E stabilizes the output impedance of the transistor.

The remaining transformer windings not already mentioned are arranged similarly with respect to the amplifier 1W and are given designations corresponding to those windings already described, with the letter E instead of W, or vice-versa.

The windings 8W and 8E are connected by an optional direct path 31 acting as a direct current and signalling frequency bypass between the lines 2E and 2W. This path contains a low pass filter comprising shunt capacitors 32E and 32W and a two winding inductor 33. If the path 31 is not required, the elements 32E, 32W and 33 can be omitted and the two halves of the windings 8E and 8W should then be connected together.

The amplifier 1W comprises a set of elements similar to those of the amplifier 1E, which elements are represented by the four blocks designated 15W, 19W, 23W and 13W, 18W.

The transformer 24E is inserted because a reversal is necessary in the feedback connection between the collector and emitter electrodes of the transistor 15E, in order that the feedback may be negative.

The variable attenuator 25E in the negative feedback path 23E is provided for adjusting the gain of the amplifier. This arrangement for adjusting gain is advisable because with present day transistors either power handling capacity or current gain can be provided but not both simultaneously.

Fig. 2 shows one example of the application of two-way repeaters according to Fig. 1 to a transmission line 34, which will be supposed to have an attenuation of 14 decibels. The repeaters 35W and 35E are terminal repeaters.

Signals are supplied to the input of the western repeater 35W at zero decibel relative level and it will be supposed that the overall equivalent of the circuit is to be 3 decibels. The relative level at the output of the eastern repeater 35E will accordingly be −3 decibels. According to the usual method of arranging the levels on a circuit of this kind, the gains of both repeaters in the west-east direction would be made equal. However, it is a property of the amplifier of Fig. 1 that the asymmetric distortion introduced by the amplifier decreases with decrease of output gain, and therefore when the gain is low, the signal level can be much higher than when the gain is high.

This enables the repeater to transmit to the input of the line at relatively high level if the gain is small, for example, 2 decibels. This produces a level of +2 decibels at the input of the line 34. The gain of the repeater 35E in the easterly direction must accordingly be 9 decibels, and this much higher gain is permissible without excessive asymmetric distortion since the output level is −3 decibels. The levels in the east to west direction will be arranged in the same way, and it will be seen that in the case of each repeater the gain of one half is different from the gain of the other half.

In Fig. 3 another example is given for a line having a total attenuation of 21 decibels. This needs an additional intermediate repeater 36 which is placed so as to divide the line into two sections 37, 38 having attenuations of 9 and 12 decibels respectively. The levels at the terminal repeaters 35W and 35E are the same as in Fig. 2 and therefore the gain of the intermediate repeater 36 must be 7 decibels in both directions. It follows that the input and output levels of repeater 36 for the east to west direction will be −10 and −3 decibels respectively, while for the west to east direction they will be −7 and 0 decibels respectively. The output level in the latter case may be as high as can be permitted with a gain of 7 decibels, if the asymmetric distortion is not to be excessive. If so, the repeater 36 could not be placed much nearer the repeater 35W, but it could, if desired, be moved not more than 3 decibels nearer the repeater 35E.

It will be understood that the examples given in Figs. 2 and 3 are only intended to illustrate the manner in which the levels may be arranged when using a repeater of the type shown in Fig. 1; the actual values of the repeater gains and signal levels quoted are not in any sense essential.

It should be added also that the circuit shown in Fig. 1 may be modified in various ways: in particular it is not restricted to the use of transistors. Ordinary thermionic valves could be used instead. Also other hybrid transformer arrangements are clearly possible.

While the principles of the invention have been described above in connection with specific embodiments, and particular modifications thereof, it is to be clearly understood that this description is made only by way of example and not as a limitation on the scope of the invention.

What I claim is:

1. A two way repeater arrangement comprising a west line and an east line, amplifiers coupled to each of said lines for transmitting in the respective directions, first and second hybrid transformers coupling the input of one amplifier to the west line and to a balancing network, and the output of the other amplifier to the west line and to said balancing network respectively, third and fourth hybrid transformers coupling the output of said one amplifier to the east line and to a second balancing network and coupling the input of said other amplifier to the east line and to said second balancing network respectively, first and second transformers coupled to the output of said amplifiers respectively and a negative feed back path for each of said amplifiers, said negative feed back path coupling the output transformer to a tapping on a winding of the hybrid transformer coupled to the input of the amplifier.

2. A two way repeater arrangement as claimed in claim 1 in which each of said amplifiers is a transistor amplifier.

3. A two way repeater arrangement as claimed in claim 2 in which each of said tappings is adjustable to vary the impedance of its respective feed back path and in which a variable attenuator is provided in each feed back path to vary the gain of the respective amplifier.

References Cited in the file of this patent

UNITED STATES PATENTS

| | | |
|---|---|---|
| 2,282,465 | Edwards | May 12, 1942 |
| 2,662,124 | McMillan | Dec. 8, 1953 |